March 16, 1965 H. H. ABBOTT ETAL 3,173,995

TRANSFER CIRCUIT FOR PRIVATE BRANCH EXCHANGE

Filed Sept. 18, 1961 2 Sheets-Sheet 1

INVENTORS H. H. ABBOTT
A. E. GERBORE
E. VON DER LINDEN

BY J. A. McCorkendale

ATTORNEY

March 16, 1965 H. H. ABBOTT ETAL 3,173,995

TRANSFER CIRCUIT FOR PRIVATE BRANCH EXCHANGE

Filed Sept. 18, 1961 2 Sheets-Sheet 2

INVENTORS H. H. ABBOTT
A. E. GERBORE
E. VON DER LINDEN

BY J. A. McCorkendale

ATTORNEY 3,173,995
Patented Mar. 16, 1965

3,173,995

TRANSFER CIRCUIT FOR PRIVATE BRANCH EXCHANGE

Henry H. Abbott, Chatham, N.J., Alexander E. Gerbore, Lynbrook, N.Y., and Ernst von der Linden, Chatham, N.J., assignors to Bell Telephone Laboratories, Incorporated, New York, N.Y., a corporation of New York Filed Sept. 18, 1961, Ser. No. 138,824
6 Claims. (Cl. 179—27)

This invention relates to a private branch exchange telephone system, and more particularly to a transfer circuit for a private branch exchange system.

In instances where a telephone customer, for example a business firm, a hotel, or the like, requires a relatively large number of extensions, it is the usual practice to provide on the premises, or conveniently located thereto, a private branch exchange, commonly referred to as a PBX. The larger PBX's are usually served by one or more attendants, or PBX operators, and functions essentially as a small telephone central office in that interstation calls between extensions on the premises are completed through the PBX as well as calls from the extensions to subscribers served through remote central offices and calls from such subscribers to extensions served by the PBX. A PBX of a type capable of serving a relatively large number of extensions and providing many advanced features is disclosed in Patent 2,904,637, issued September 15, 1959, R. D. Williams.

In instances where a relatively small number of extensions are to be served and where some of the features provided by the type of PBX covered by the above-mentioned patent are not essential, a somewhat simplified and less expensive installation is often preferred. This is particularly true where the PBX is to be used largely for interextension or intercommunicative service, and the trunk and attendant facilities of the extensive nature described in the referred-to patent may be simplified or omitted entirely since they are not required for intercommunicating service alone. In order to provide some "outside" service however, a limited number of key telephone sets are provided at the PBX, each of which may be reached over a central office trunk by dialing the respective number assigned thereto. Outgoing calls may also be originated at these sets.

This simplified type of PBX has not appeared to be capable of providing entirely satisfactory service, however, since it has been found that many of the incoming calls answered by the key telephone set could best be processed by one of the PBX extensions; no entirely satisfactory means has been provided heretofore for use in this simplified type of PBX whereby the incoming call could be transferred under control of the answering key telephone set to the desired extension.

Accordingly, it is an object of our invention to improve the operation of private branch exchange systems.

Another object of the invention is to increase the capabilities of simplified types of PBX's.

A more specific object of the invention is to facilitate the transfer of a call, incoming to and answered by a key telephone set at a PBX, to a selected extension.

In accordance with a specific embodiment of our invention, wherein an arrangement is provided for completing a connection between a central office trunk and a PBX extension, the trunk and the extension terminate in respective line circuits each of which has an appearance on a key telephone set. An "add-on" circuit is interposed between the two line circuits whereby to complete the connection between the central office trunk and the extension under control of the user of the key telephone set. The user of the key telephone set upon answering an incoming central office trunk call and ascertaining that the call should be directed to a respective extension, first operates a hold key to "hold" the incoming trunk and then "picks up" the PBX line circuit and dials the number of the desired extension. When the extension answers the user of the key telephone set informs the extension subscriber of the incoming call and then operates her transfer key which is effective to remove the hold on the central office trunk and to cut it through to the desired extension. Two relays are included in the add-on circuit which operate following the operation of the transfer key, operation of the first relay being effective to cut through the central office line, or trunk, and associated line circuit to the add-on circuit and operation of the second relay being effective to complete the connection from the add-on circuit through the PBX line circuit to the desired extension. In view of the function performed by the key telephone set user in transferring incoming calls and originating outgoing calls the key telephone set may be referred to herein as an attendant's set and the user may be referred to on occasion as the attendant.

A feature of the present invention is an add-on circuit including two relays and means under control of a key telephone set user for causing operation of both relays whereby to complete a connection through the add-on circuit of a central office trunk and a PBX extension.

A further feature of our invention is means operable by the key telephone set user whereby an existing connection between a central office trunk and a PBX extension may be interrupted and control of the trunk regained by the key telephone set user.

A still further feature of the invention is means effected by extension disconnect for releasing the two relays included in the add-on circuit whereby to interrupt the through connection and restore the circuits to normal condition.

A full understanding of the arrangement contemplated by the present invention as well as an appreciation of the various features thereof may be gained from consideration of the following detailed description in connection with the accompanying drawing in which.

Figures 1, 3:
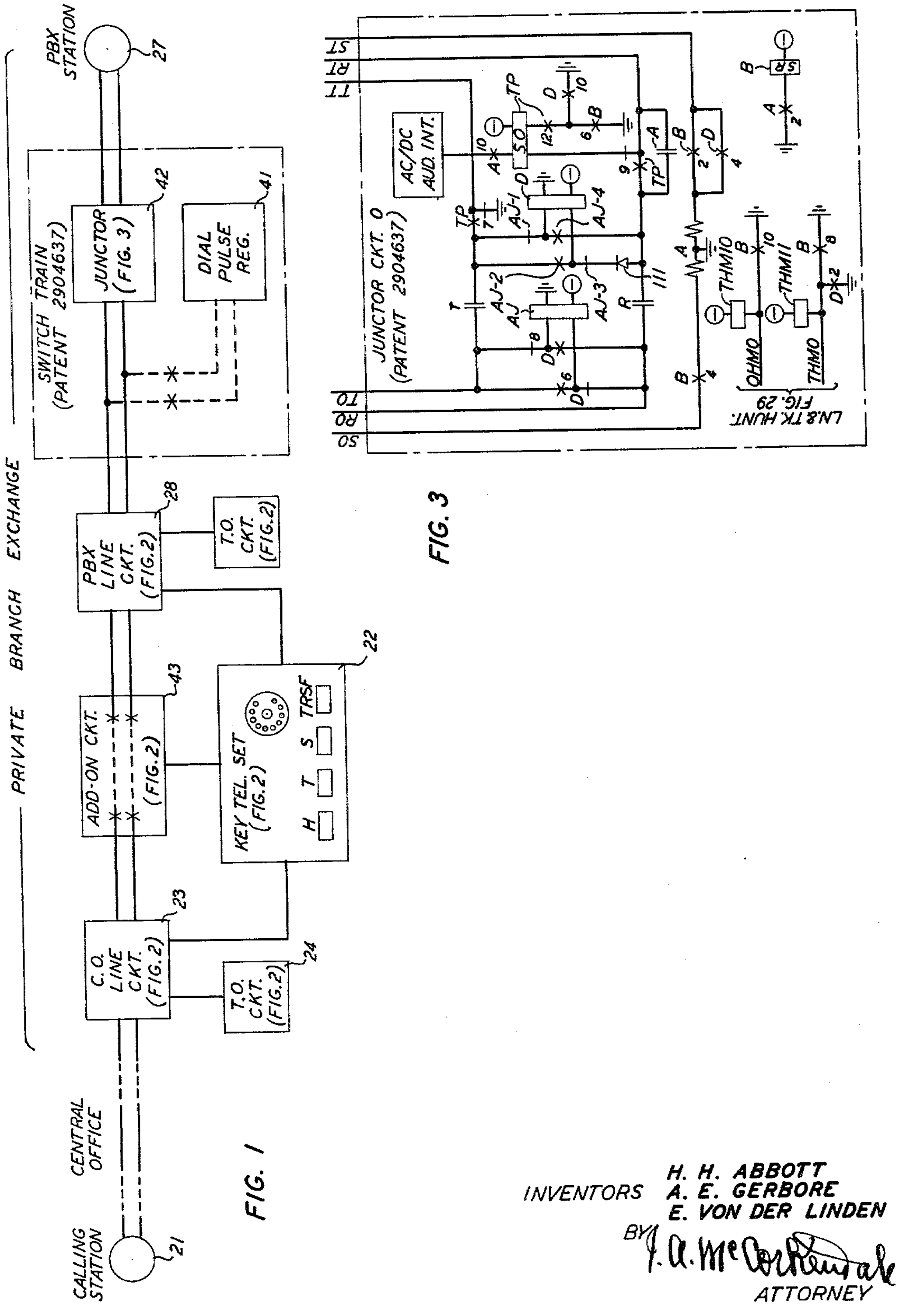
FIG. 1 shows schematically the manner in which the add-on circuit and related circuits contemplated by the present invention may be associated with other portions of a private branch exchange system.
FIG. 3 is a detailed showing of the modified junctor circuit used in the specific illustrative embodiment of the invention.

Referring now to the drawing, and first to FIG. 1, it will be assumed that calling station 21, associated with a remote central office, has dialed the number assigned to key telephone set 22, which is located at the private branch exchange, and has been connected thereto over a trunk and through central office line circuit 23. (In the following description the terms "trunk," "central office line," "outside line" and the like may be used interchangeably to designate the connection between the central office and the PBX.) The user of the key telephone set, alerted to the call by audible and visual signals as subsequently described in detail in connection with FIG. 2, responds by operation of the Trunk (T) key on her key telephone set and by going "off-hook" which closes her switchhook. (In the event the user of the key telephone set did not respond to the call within a predetermined time, for example of the order of from 30 to 45 seconds, the time-out circuit 24 operates to disconnect the locked-in ringing in a manner described in detail subsequently.)

Closure of the switchhook and operation of the Trunk key are effective to disconnect the audible ringing signal and to change the visual signal from flashing to steady; the calling subscriber and the key telephone set user are now connected for talking.

Assuming now that it be found desirable to connect calling station 21 to called PBX station 27, the key telephone user first operates her Hold (H) key which causes the incoming call to be held in the manner to be described in detail subsequently in connection with FIG. 2. The Station (S) key is then operated which connects key telephone set 22 through the PBX line circuit 28 to the switch train equipment which includes dial pulse register 41 and originating and terminating junctor 42. (Portions of the switching equipment which are not essential to the present disclosure, so far as details of their arrangement and operation are concerned, will not be described in detail and in the present connection in order to avoid undue enlargement and unnecessary complication of the disclosure. Reference may be had to the above-mentioned R. D. Williams Patent 2,904,637 for a full disclosure of switching equipment of a type adapted for use in the present connection.) Upon receipt of PBX dial tone, the key telephone set user dials the number of PBX station 27 and when the station goes off-hook the PBX extension user is informed of the waiting outside call. Now in order to effect a through connection at the PBX between calling station 21 and PBX station 27 the key telephone set user operates her Transfer (TRSF) key; this is effective, in a manner to be described subsequently in connection with FIG. 2, to remove the "hold" from the incoming call and to operate two relays included in add-on circuit 43. Operation of one of these relays is effective to cut through the line from central office line circuit 23 to add-on circuit 43, and operation of the other of the relays is effective to complete the connection from the add-on circuit through the PBX line circuit 28 to the PBX station 27. The key telephone set user may now leave the connection by going on-hook or by operating another trunk or station key on her telephone set.

In view of the relatively small number of outside lines terminating at the PBX it may well happen that, in the event of an emergency or for some other reason, it becomes imperative that the key telephone set user be able to regain exclusive control of an outside line even though it has been connected to a PBX station as above described and the key telephone set user has cut away from the connection. In accordance with the novel arrangement contemplated by our invention the key telephone set user, may, after such warning to the talkers as is feasible, by a second operation of her Transfer key cause the two above-mentioned relays of the add-on circuit to release thereby interrupting the through connection between calling station 21 and PBX station 27 and restoring control of the outside line to the key telephone set 22. In this situation if it be desired to maintain the outside connection the Trunk key is operated before operation of the Transfer key.

*Incoming call to key telephone set*

Figure 2:
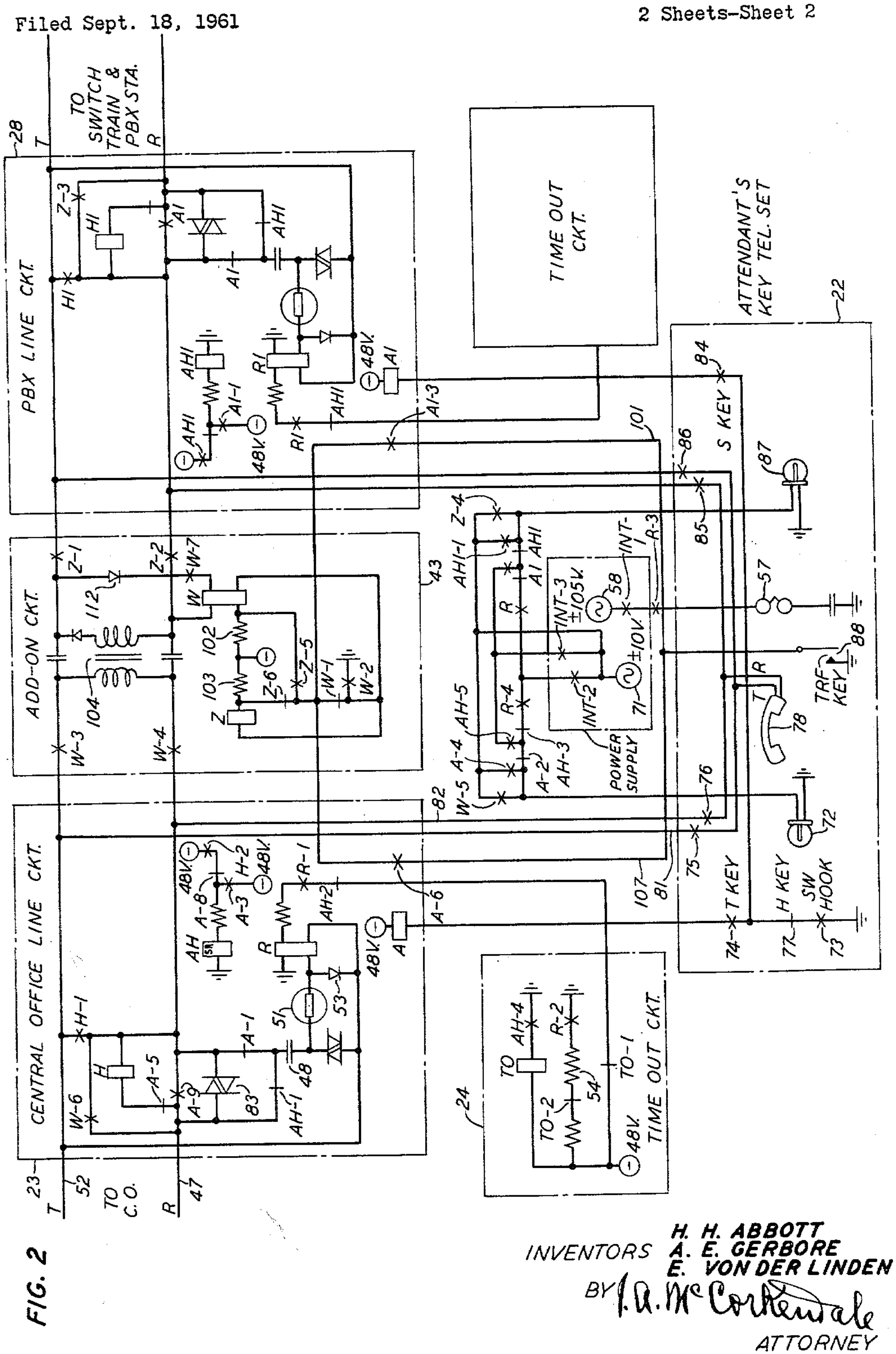
FIG. 2 is a detailed showing of the add-on circuit and associated circuits contemplated by the invention in one specific illustrative embodiment thereof.

Referring now to FIG. 2, it will be assumed, as above, that the calling station is connected through a central office line circuit 23 and that ringing current is applied from the central office to ring conductor 47 of the line. The A.C. component of the ringing current flows through break contact AH–1 of relay AH, capacitor 48, thermistor 51, secondary (lower) winding of relay R, tip conductor 52 and through the line loop on one half of the cycle; the path for the other half of the cycle is the same except that the lower winding of relay R is by-passed by a path through varistor 53. It will be noted that at this point a path through break contacts AH–1 of relay AH and A–1 of relay A serves as a shunt around relay H whereby to by-pass ringing current and to prevent the setting up of a false hold condition which might otherwise occur when a number of ringers are bridged across the station side of the line.

When the ringing current is first applied, thermistor 51, being "cold" has a relatively high resistance and prevents the flow of sufficient current to operate relay R; this prevents false operation from disconnects or transients. However, as the ringing current continues, power absorbed therefrom heats thermistor 51 and causes its resistance to gradually decrease until, after a predetermined interval, for example of the order of one-half second, sufficient current flows to operate relay R on the half-wave rectified current due to varistor 53.

Relay R, upon operating, locks over a path from ground, upper (primary) winding and make contact R–1 of relay R, break contact AH–2 of relay AH, break contact TO–1 of thermal relay TO of the time-out circuit 24 to battery. Also, relay R operated completes a path through its R–2 make contact and heater element 54 of thermal relay TO to battery; heater element 54 is energized over this path for a purpose which is described below.

Also relay R, upon operating, completes at its R–3 make contact a path for operation of ringer 57 of key telephone set 22 from source 58, this path being interrupted at a suitable rate at interrupter contact INT–1. At the same time a path is completed from source 71 through make contact R–4 of relay R and break contacts AH–3 of relay AH and A–2 of relay A for energization of lamp 72 at the key telephone set; this path is interrupted at interrupter contact INT–2 at a suitable rate, for example 60 impulses per second, to cause lamp 72 to flash.

Assuming that the user of the key telephone set 22 is available, she will respond to the audible signal from ringer 57 and the flashing lamp 72 by going off-hook, which closes switchhook 73, and by operating her Trunk key; operation of the Trunk key closes at make contact 74 thereof an obvious operating path for relay A, and closes at respective make contacts 75 and 76 a connection between handset 78 and tip conductor 52 and ring conductor 47.

Operation of relay A completes at its A–3 make contact an obvious operating path for relay AH, which operates, and changes at its A–4 make contact the energizing path for lamp 72 to "steady." (Previously "flashing" through A–2 break contact.) Relay A, operated, also opens at its A–5 break contact the path to the winding of relay H to prevent a possible false operation thereof and closes ring lead 47 at its make contact A–9.

Relay AH, operated, opens at its AH–2 break contact the holding path for relay R, which releases, and opens at its AH–1 break contact the ringing bridge across the line. Also, relay AH upon operating, completes at its AH–4 make contact an obvious operating path for relay TO which, upon operating, opens at its TO–2 break contact the energizing path for heater element 54 thereby disabling the time-out circuit 24.

In the event the key telephone set user had not answered the call within a predetermined period as determined by characteristics of time-out circuit 24, for example a period of the order of from 30 to 45 seconds, break contacts TO–1 of relay TO would be opened by thermal action thereby interrupting the locking path of relay R and releasing the relay. This would interrupt the visual and audible signals at the key telephone set 22 at make contacts R–4 and R–3, respectively.

*Key telephone set user holds incoming call and dials PBX extension*

Returning now to the circuit condition following "answer" by the key telephone set user and operation of relays A and AH, the calling subscriber and the key telephone set user are now in talking connection. Assuming that it becomes evident that the calling subscriber should advantageously be connected to the PBX station 27 (FIG. 1), the key telephone set user will first operate her Hold key 77 in order to "hold" the incoming call at the central office line circuit 23.

Operation of the Hold key 77 will interrupt the path over which relay A is held operated and relay A therefore releases. Release of relay A, in turn, opens at its A–3 make contact the operating path of relay AH which, however, does not immediately release due to its slow-to-release characteristic. Release of relay A closes a path for operation of Hold relay H by line current passing through telephone set 78, the path being traced from tip lead 52, lead 81, make contact 75 of Trunk key, telephone set 78, make contact 76 of Trunk key, lead 82, winding of relay H, break contact A–5 of relay A to ring lead 47. Relay H, upon operating, completes at its H–1 make contact a path which connects its winding across the tip 52 and ring 47 as a holding bridge for the central office line. Also, relay H upon operating completes at its H–2 make contact an alternate operating path for relay AH through break contact A–8 of relay A thereby preventing its release by the release of relay A. Mechanical interlock between the Hold and Trunk keys releases the Trunk key when the Hold key restores to normal position. Signal lamp 72 is now changed to "wink" by energization over a path from source 71, interrupter contacts INT–3, operating for example at a rate of 120 impulses per second, make contact AH–5 of relay AH, break contact A–2 of relay A, lamp 72 to ground. Varistor 83 is connected in parallel with the winding of relay H and acts to stabilize the sensitivity of the relay when it is subjected to varying voltages.

The key telephone set user now depresses her Station key for connection through PBX line circuit 28 to the switch train (FIG. 1) and receives dial tone therefrom; handset 78 is now connected to the PBX line circuit through make contacts 85 and 86 of the Station key. Relay A1 (corresponding to relay A of the central office line circuit 23) operates over an obvious path including make contact 84 of the Station key and closes at its make contact A1–1 an operating path for relay AH1, which operates. Station lamp 87 now lights "steady" over a path from source 71, make contact AH1–1 of relay AH1, lamp 87 to ground. Upon receiving dial tone, the key telephone set user dials the number of PBX station 27 and when the extension user responds he is informed of the incoming call awaiting his attention.

*Key telephone set user operates transfer key*

The key telephone set user now closes her Transfer key 88 which completes a path for operation of relay W traced from ground, Transfer key 88, lead 101, make contact A1–3 of relay A1, break contact W–1 of relay W, lower (sceccondary) winding of relay W, resistor 102 to battery; relay W operates over this path and locks to ground on its W–2 make contact. Relay Z does not operate at this point since ground is connected to each side of the winding thereof break contact Z–6 of relay Z being included in one connection.

Relay W, operated, cuts through at its make contacts W–3 and W–4 the tip 52 and ring 47 of the central office line in series with inductor 104, continues the "steady" lighting of trunk lamp 72 from source 71 through make contact W–5 of the W relay, and closes at its W–6 make contact a path which shunts the operating path of relay H thereby releasing the relay and removing the holding bridge from the line.

Now when Transfer key 88 is released and the ground removed from lead 101, relay Z operates over a path from ground, make contact W–2 of relay W, winding of relay Z, resistor 103 to battery. Relay Z, operated connects at its make contacts Z–1 and Z–2 the tip and ring leads on through from inductor 104 to PBX station 27; the cut-through of calling station 21 to PBX station 27 is now complete and the key telephone set user may leave the connection and go on-hook. Also, relay Z upon operating completes a path at its Z–3 make contact which shunts the operating winding of the holding relay H1 of the PBX line circuit 28, whereby to prevent possible false operation thereof, and also maintains through its Z–4 make contact a path over which station lamp 87 is lighted "steady."

*Reseizure of trunk by key telephone set user*

While a connection prevails between the outside party and a PBX extension it may become imperative that the key telephone set user be able to regain immediate control of the central office trunk; for example in the event of the emergency the trunk may be required for an outgoing call. The novel arrangement contemplated by our invention, particularly the arrangement of the W and Z relays in the add-on circuit, permits this switching operation to be quickly and simply executed. Assuming for purposes of description that a connection has been established between the outside line and the PBX extension as above described and assuming, further, that the key telephone set user finds it necessary to reseize the central office trunk, she will first, if feasible and as a matter of courtesy, re-enter the station line by operation of her station key closing contacts 85 and 86 and inform the PBX station user of the impending cutoff. The key telephone set user will then re-enter the central office line circuit by operation of Trunk key closing contacts 74 which causes operation of relay A. Transfer key 88 is now closed thereby completing a path for shunting down and releasing relay W, this path being traced from ground, Transfer key 88, line 107, make contacts A–6 of relay A and Z–5 of relay Z, resistor 102 to battery; relay W releases. Relay W released, interrupts at its W–2 make contact the operating path of relay Z which also releases. Release of relays W and Z interrupts at make contacts W–3 and W–4 and Z–1 and Z–2, respectively, the through connection between the outside caller and the PBX station, and control of the outside line is now with the key telephone set user and not the PBX station. In this way a PBX station is prevented from tying-up an outside line.

Under some circumstances the user may "enter the connection" first by way of the trunk, i.e., by first operating the Trunk key, and thus be poised for making the outgoing call.

*PBX station goes on-hook; circuit restores to normal*

In the event of a normal disconnect by PBX station 27, the circuit is restored to normal through a novel procedure which involves a reversal of battery and ground towards the station side of add-on circuit 43 resulting from operation of the junctor circuit. So far as the basic arrangement and operation of the junctor is concerned they are as fully disclosed in the above-mentioned R. D. Williams' Patent 2,904,637 (see, for example, FIG. 24 and the portion of the specification starting at line 12 of column 59 and continuing through line 70.) As shown in our FIG. 3 a slight modification has been made in the basic junctor circuit in order to cause the above-mentioned reversal of battery and ground upon operation of junctor relay AJ. (In order to avoid confusion herein by duplication of relay designations the junctor relay "A" of the Williams' patent has been redesignated "AJ" herein.) When the conversation has been completed and PBX station 27 goes on-hook, junctor relay AJ will release, as described in the Williams' patent, and due to the opening of make contacts AJ–2 and AJ–4 and the closing of break contacts AJ–1 and AJ–3, battery and ground fed back towards the station side of the add-on circuit will be reversed. Due to the poling of diodes 111 (FIG. 3) and 112 (FIG. 2), current will now pass through make contact W–7 and the upper (primary) winding of relay W in a direction to overcome the effect of the current in the secondary thereby releasing the relay. (Relay W is differentially wound and the current flowing through the primary winding will overcome the holding current in the secondary.) Release of relay W is followed by release of relay Z and the circuit is restored to normal.

It will be apparent, of course, that the described arrangement may be utilized for normal key telephone system operation when a transfer of a call is not required. That is, for example, in the first situation described above the call could have involved only the calling station 21 and the key telephone set 22 and have been completed on that basis. Also, since the central office line circuits, as 23, and the PBX line circuits, as 28, are substantial duplicates, it will be apparent that outgoing calls originated by PBX stations can be completed by the key telephone set by a procedure similar to that described above for answering an incoming call, except that the station pick-up key depressed must be associated with the particular PBX line on which the call is to be made; also in this instance the R relay will be in released condition. The call is then advanced in the normal manner. Also an outgoing call can be "held" by the key telephone set user in the manner described above in reference to the incoming call. When a "held" line is seized by any station of the key telephone system (by operating the associated pick-up key and by going off-hook) relay A is operated which opens the locking path of the H (holding) relay causing it to release and remove the holding bridge. This restores the circuit to talking condition.

It will be clear from the above description of a specific illustrative embodiment of the present invention that there is contemplated in connection with an add-on or transfer circuit a simple, novel, arrangement of two relays whereby the transfer is readily achieved and where the central office line may be readily reseized by the attendant, or key telephone set user, should occasion arise making such action imperative. The same relay arrangement is utilized in the normal release of the circuit occurring upon completion of the connection and hang-up by the PBX extension.

While a specific embodiment of the invention has been selected for detailed disclosure, the invention is not, of course, limited in its application to the embodiment disclosed. The embodiment which has been described should be taken as illustrative rather than restrictive thereof.

What is claimed is:

1. In a telephone system, a calling station, a central office, a private branch exchange, a line connecting said central office and said private branch exchange, a key telephone set, means for connecting said calling station and said key telephone set over said line for communication therebetween, an extension telephone set at said private branch exchange, means for connecting said key telephone set and said extension telephone set for communication therebetween, an interconnecting circuit at said private branch exchange, a first relay and a second relay in said interconnecting circuit effective when operated to connect said calling station and said extension station through said interconnecting circuit, said first relay having a first winding and a second winding, means under control of said key telephone set for passing a current through said first winding whereby to operate said first relay, means effective upon operation of said first relay to pass a holding current through said first winding, means effective while said first relay is held operated and also under control of said key telephone set for operating said second relay, means under control of said key telephone set for releasing said relays whereby to interrupt the connection between said calling station and said extension station, and additional means under control of said extension station for releasing said first relay.

2. In a telephone system, the combination defined by claim 1 further characterized in that said last-mentioned means includes means for passing current through said second winding in the proper direction and of sufficient magnitude to overcome the effect of said holding current and to release said first relay.

3. In a telephone system, a calling station, a central office, a private branch exchange, a line connecting said central office and said private branch exchange, a key telephone set at said private branch exchange, an extension telephone set at said private branch exchange, means for connecting said calling station over said line to said key telephone set for communication therewith, means for connecting said key telephone set and said extension set for communication therebetween, an interconnecting circuit at said private branch exchange, a first relay and a second relay included in said interconnecting circuit, a transfer key at said key telephone set operable between an open position and a closed position, means effected by a first movement of said transfer key to said closed position for operating said first relay, means effected by subsequent movement of said transfer key to said open position for operating said second relay, means effected by operation of said first relay for connecting said line to one of said interconnecting circuit and means effected by operation of said second relay to connect the other end of said interconnecting circuit to said extension set whereby to effect a through connection of said calling station and said extension set, and means effected by a second operation of said transfer key to said closed position for releasing said first and said second relays whereby to break down the connection between said calling station and said extension set.

4. In a telephone system, the combination defined by claim 3 further characterized in the provision of means effected by said extension set going on-hook for releasing said first and said second relays.

5. In a PBX telephone system, a key telephone station, a central office line circuit, a PBX line circuit, means for individually connecting said line circuits to said key telephone station, and an add-on circuit under control of said key telephone station for interconnecting said line circuits to the exclusion of said key telephone station, said add-on circuit including a first relay having a pair of windings and a second relay, key means at said key telephone station for energizing one of said first relay windings on closure of said key means, means responsive to said first relay for energizing said second relay on release of said key means, means connected to said PBX line circuit for energizing said other first relay winding to release said first relay, and means independent of said last-mentioned means and under control of said key telephone station for interrupting current flow through said one first relay winding for releasing said first relay, release of said first relay interrupting the interconnection between said line circuits.

6. In a PBX telephone system, the combination set forth in claim 5 wherein make contacts of said first relay are connected in series with said central office line circuit, make contacts of said second relay are connected in series with said PBX line circuit, and means including contacts of said first relay providing a holding path for said first and second relays, said means under control of said key telephone station for interrupting current flow through said one first relay winding for releasing said first relay including contacts of said second relay.

References Cited in the file of this patent

UNITED STATES PATENTS 2,993,095 Arnold ---------------- July 18, 1961